June 25, 1957     G. P. PEED, JR     2,796,774
CONTROL SYSTEM RATIO SHIFT MECHANISM Filed May 3, 1952     3 Sheets-Sheet 1

Garland P. Peed, Jr.
INVENTOR.

BY *Dame M. Clark*

HIS PATENT ATTORNEY.

June 25, 1957  G. P. PEED, JR  2,796,774
CONTROL SYSTEM RATIO SHIFT MECHANISM
Filed May 3, 1952  3 Sheets-Sheet 2
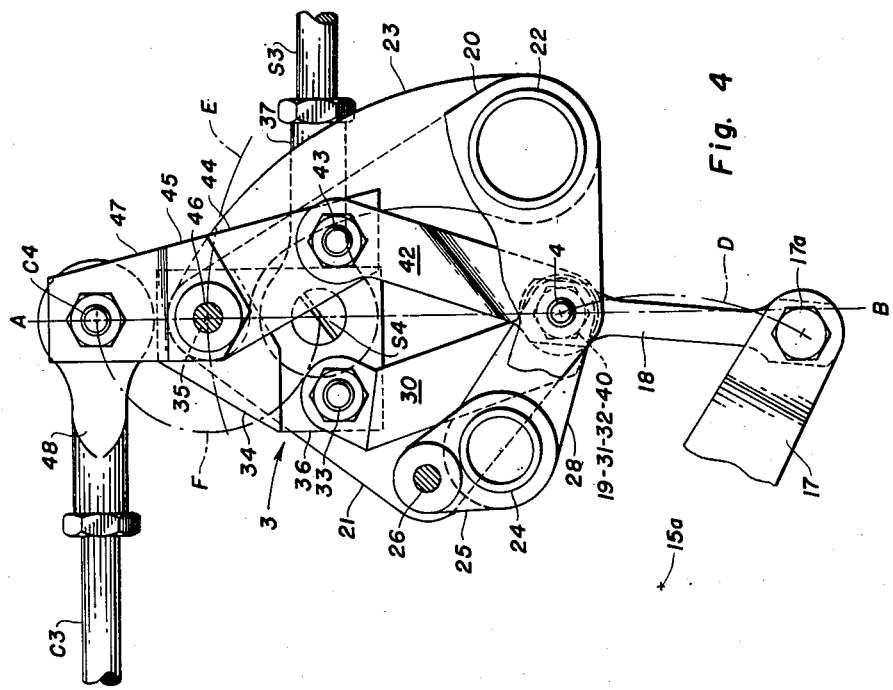
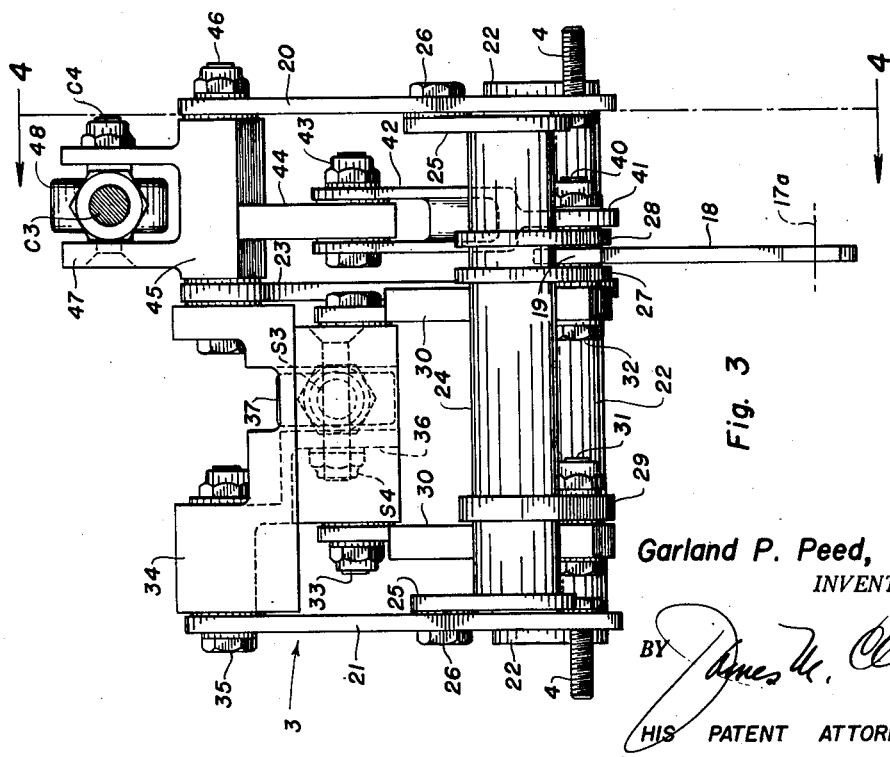
Garland P. Peed, Jr.
INVENTOR.
BY James M. Clark
HIS PATENT ATTORNEY.

June 25, 1957  G. P. PEED, JR  2,796,774
CONTROL SYSTEM RATIO SHIFT MECHANISM
Filed May 3, 1952  3 Sheets-Sheet 3

Garland P. Peed, Jr.
INVENTOR.

BY
HIS PATENT ATTORNEY.

United States Patent Office 2,796,774
Patented June 25, 1957

2,796,774

CONTROL SYSTEM RATIO SHIFT MECHANISM

Garland P. Peed, Jr., Pacific Palisades, Calif., assignor to North American Aviation, Inc.

Application May 3, 1952, Serial No. 285,997

11 Claims. (Cl. 74—522)

The present invention relates generally to variable ratio controls and more particularly to improvements in variable ratio shift mechanisms for the operation of the control surfaces of aircraft and the like.

In the control and operation of many devices it is frequently desirable that the mechanical advantage within a control system be increased or decreased in accordance with changes in operating conditions and other circumstances. In the operation of the control surfaces of aircraft, in particular, it has been found desirable to provide means for mechanically augmenting the forces applied by the pilot to the control stick or other control for applying an increased force to the control surface, usually through a lesser distance, when due to certain flight conditions the forces opposing displacement of the surface have been increased. These problems have been attacked and to a great extent overcome in modern high speed aircraft both by the use of hydraulic boost devices and variable ratio linkage arrangements, and the present invention relates to improvements in the latter type of devices in which a variable ratio is continuously obtainable between the limits of the linkage.

Briefly stated, the present invention comprises a variable ratio linkage mechanism capable of use in an aircraft flight control system wherein a first control rod connected to the control stick and a further control rod connected to the control surface are pivotally mounted upon links, which in turn are pivotally carried by a supporting member which in turn is pivotally mounted upon the aircraft structure. The linkage mechanism is controlled through a pilot-actuated shift lever movable between two extreme positions at either of which it may be locked, and the linkage mechanism positions the control rods with respect to the main center of rotation of the supporting member such that the terminals of both control rods are either equidistant from the main center or such that the control rod terminal connected from the control stick is at a radial distance from that center which is variably greater than the terminal of the control rod connected to the control surface, to thereby give a corresponding mechanical advantage to the pilot as he applies forces to the control stick to move the control surface. The improvement also includes improved means by which the pilot shift lever may be automatically latched in either of the two extreme positions of the device.

It is, accordingly, a primary object of the present invention to provide an improved variable ratio linkage mechanism which can provide either a direct connection between a control lever and a controlled instrumentality or an adjusted position of the mechanism in which a mechanical advantage is obtained. It is a further object to provide a multiple variable ratio linkage mechanism for the operation of a control surface of an aircraft in which the mechanism can be quickly and easily adjusted into either one of an infinite number of positions and in certain of which the mechanism is automatically locked. It is a further objective to provide shifting, locking and variable mechanical advantage mechanism which is simple, positive-acting and foolproof in its operation. It is a further object to provide variable ratio mechanism of the present type in which provision is made for rapid shifting from a one to one (1:1) ratio to, for example, a two to one (2:1) ratio, or any intermediate ratio, by means of a simple control accessible to the operator; and to provide such a mechanism which avoids movement of either the control stick or the control surface to accomplish the shift in mechanical advantage. It is a still further object to provide a novel and improved arrangement of the variable ratio shifting and locking assemblies as well as an advantageous relationship of the individual elements with respect to each other.

Other forms and advantages of the present invention will occur to those skilled in the art after reading the following description, taken in conjunction with the accompanying drawings, forming a part hereof, in which:

Fig. 3 is a transverse view to a more enlarged scale of the variable ratio linkage mechanism in an adjusted 2:1 ratio position;

Fig. 4 is a side elevational view of the same as taken along the lines 4—4 of Fig. 3;

Figure 1:
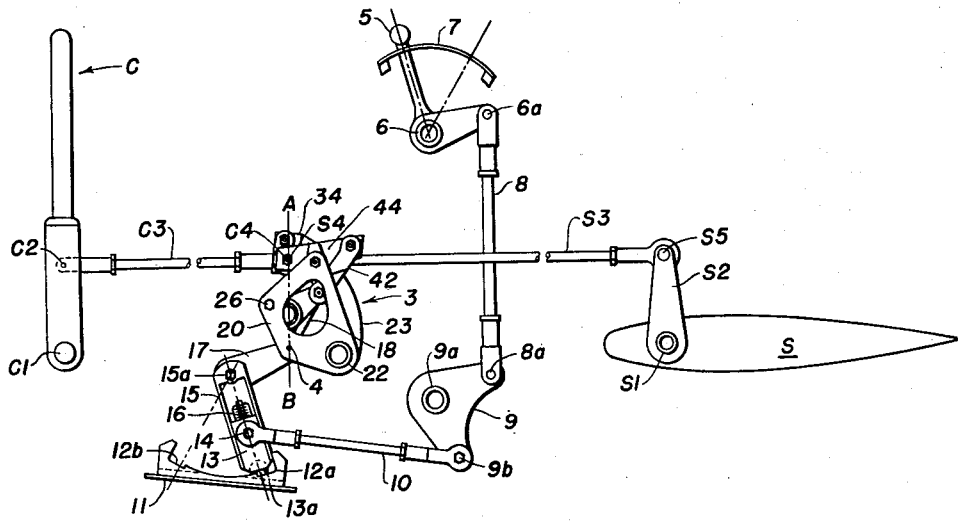
Fig. 1 is a diagrammatic view of a portion of an aircraft control system to which an improved form of the present variable ratio linkage mechanism has been applied.

Referring now to Fig. 1, the reference letter C represents the control stick of an airplane pivotally mounted upon the aircraft structure at C1 and pivotally connected at C2 to a push-pull rod C3 having an aft pivotal terminal at C4. The airplane is provided with one or more control surfaces, indicated by the reference letter S, provided with a torque tube S1 suitably journalled or supported from the aircraft structure and to which torque tube there is fixedly attached the control horn or lever S2. It will be understood that the control surface S may represent either of the ailerons of the aircraft, an elevator or a rudder, or other movable surface, and that in the case of an aileron the system would also include a second aileron with suitable control mechanism for its differential or opposite operation in an obvious and well known manner. The control lever S2 is pivotally connected to the aft terminal of a push-pull rod S3 at the pivot S5, and the push-pull rod is provided with a forward pivotal terminal S4 which in Fig. 1 has its axis transversely aligned with the aft terminal C4 of the push-pull rod C3, these coinciding axes lying within the transverse vertical plane indicated by the line A—B in Fig. 1. In the arrangement shown in this figure, the connection is direct and no mechanical advantage is provided by the linkage mechanism inasmuch as the push-pull rods C3 and S3 are longitudinally aligned and are each disposed at the same radial distance from the pivotal mounting of the variable ratio mechanism 3. This pivot 4 also lies along the vertical line A—B, and the mechanism 3, together with the shiftable pivotal connections C4 and S4, rotate or rock about this pivot as the control stick is rocked about its pivot C1.

The mechanism by which the ratio is shifted or adjusted from the one to one ratio shown in Fig. 1 to the two to one ratio, or any intermediate ratio, is also shown in this figure while a shifted relationship is shown in Figs.

Figure 2:
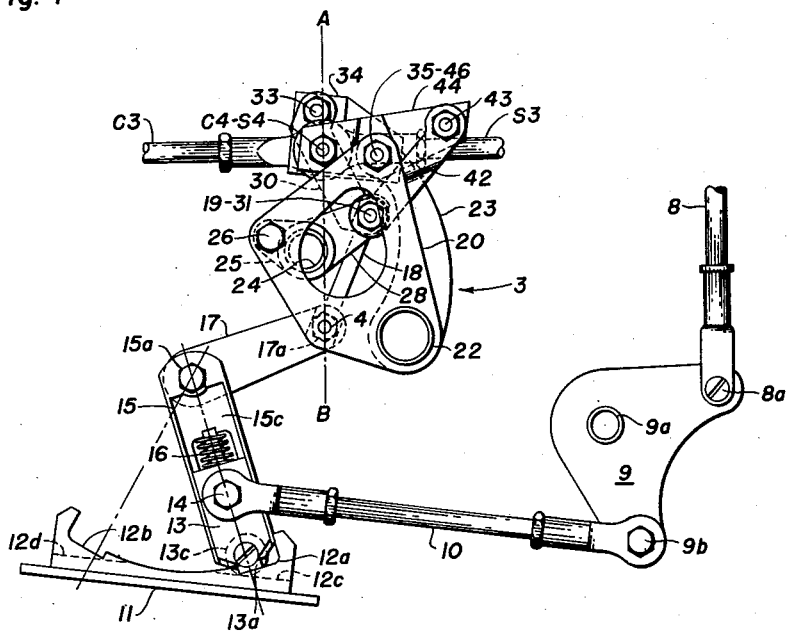
Fig. 2 is a similar view to an enlarged scale of a portion of the same showing the variable ratio linkage mechanism.

3 and 4. To obtain the two to one ratio, for example, the pivot C4 is rotated to a position which is radially more distant from the support member pivot 4, and the pivotal connection S4 is rotated to a position at which it is radially closer to the supporting pivot 4. This ratio shift is accomplished by the operating handle 5 which is essentially a bell-crank lever pivotally mounted upon the aircraft structure at 6 and movable along a sector 7 which is preferably mounted upon the pilot console in the aircraft cockpit. The remaining terminal of the handle or bell-crank lever 5 is pivotally connected at 6a to the vertical push-pull rod 8, which in turn is pivotally connected at 8a to the lower bell-crank 9. Also as is indicated in Fig. 2 to a larger scale, the bell-crank 9 is pivotally mounted upon the aircraft structure at 9a and has its opposite arm portion pivotally connected to the push-pull rod 10 at the pivot 9b.

Figure 5:
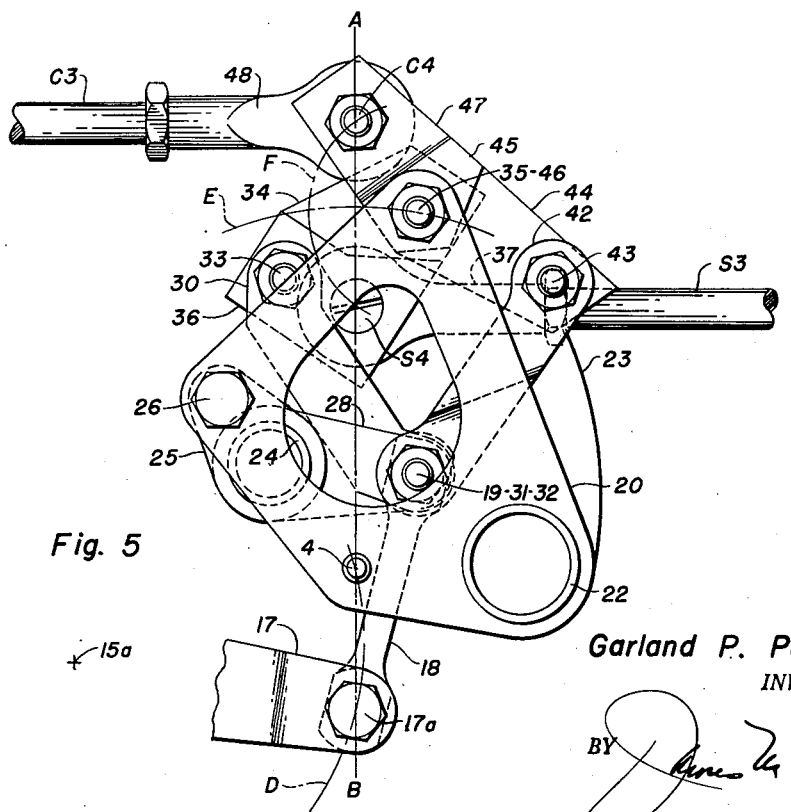
Fig. 5 is a similar view of the mechanism adjusted to a position intermediate those shown in Figs. 2 and 4.

The locking mechanism comprises an arcuate sector 11 fixedly supported upon the aircraft structure and having a pair of notches 12a and 12b for engagement by the lock pin 13. The ratio changing unit 3 is shifted by means of the foregoing linkage from the pilot's control handle 5 connecting to the bell-crank 9 and the connecting link 10 which is pivotally attached at 14 to the housing 15 of the locking pin assembly. The housing 15 forms a first leg of a bell-crank lever pivotally mounted upon the aircraft structure at 15a and having as its other leg the lever portion 17 extending toward ratio changing unit 3. The lock pin 13 is axially shiftable within the housing 15 and is urged into its engaging position by the compression spring 16. Initial movement of the linkage causes the pin 13 to slide axially upward within the housing 15 to effect the disengagement of the pin from the retaining notch 12a. Continuing pressure transmitted through the push-pull link 10 will swing the entire lock unit or bell-crank assembly 15—17 to a point where the locking pin will engage the alternate notch 12b, the spring-loading by the spring 16 insuring positive engagement at the latter position. As indicated above, the lock pin housing 15 (and as more fully disclosed in Figs. 6, 7 and 8) is integrally fixed to the arm 17 by the square shank pivot pin 15a engaging the square hole 15b, forming a bell-crank arrangement which in turn pivotally connects at 17a to an actuating link 18 by means of which the ratio mechanism 3 is shifted. All of the mechanism in Figs. 1 and 2 is shown in the one to one ratio position and as the handle 5 is rotated rearwardly along the sector 7 and the lock pin housing 15 is rotated into its extreme forward construction line position, in which it is locked in the notch 12b, all of the mechanism assumes the two to one ratio position, as shown in Figs. 3 and 4, or it may be held in an intermediate position, as shown in Fig. 5, for an intermediate ratio, or higher than 2:1 ratios may be obtained.

Referring now to the latter figures, and more particularly to the elevational view in Fig. 4, the ratio changing unit may be seen in an alternate, or two to one position, wherein the attachment point C4 for the control rod C3 has been displaced away from the pivot point 4 of the unit whereas the attachment point S4 for the control rod S3 has been moved closer to the main pivot pin 4 of the unit. The resultant displacement of the attachment points for the push-pull rods C3 and S3 provides a lever arm measured from the point 4 to the point C4 which is substantially twice the length of the lever arm from the point 4 to the point S4. Inasmuch as it is necessary that the respective push-pull rods C3 and S3 be not displaced longitudinally during the ratio changing operation in order that movement of the control stick or of the control surface will not result from this operation, the present mechanism is arranged to prevent any such displacement principally by the rocking of the unit 3 about the axis of the support 4 and causing either end of the link 18 to be aligned with this axis in each of the extreme shifted positions.

The ratio changing unit mechanism 3 comprises the side plate members 20 and 21, which form the supporting frame and are secured in fixed relationship upon a tubular member 22. An arcuate auxiliary supporting arm 23 is also integrally mounted on the tubular member 22, thereby forming a rigid frame which is rockable about the axis of the mounting support at 4. A secondary tubular member 24 is pivotally supported between the plate members 20 and 21 by means of the offset lugs 25 adjacent the plate members to which they are pivotally mounted by the pivot bolts 26. The tubular member 24 is provided with a pair of arms 27 and 28 between the extremities of which the link 18 is pivotally secured at 19. An arm 29 is also provided upon the member 24 being spaced axially from the foregoing pair of arms 27 and 28, and a pair of intermediate links 30 are also secured to the outer end of the member 29 at the pivot 31, and to the member 27 at the pivot 32. Each of these legs are pivotally secured upon the centerline or axis which coincides with the attachment point at 19 for the link 18, and which also is coaxially aligned with the axis of pivotation 4 of the entire unit 3. The opposite ends of the links 30 are in turn pivotally secured at 33 to a block member 34 which is pivotally mounted at 35 to the frame member 21 and to the auxiliary arm 23 by the pivot bolt 46. The block member 34 is provided with a bifurcated portion 36 to which the terminal 37 of the surface push-pull rod S3 is pivotally connected by means of the above-mentioned pivot S4, for the rod end bearing 37.

Additionally there is pivotally secured at the pivot 40, also aligned with the pivots 4, 19, 31 and 32, to the arms 27 and 28, carried by the tubular member 24, one end of a link 41, the opposite end of which includes the bifurcations 42 between which is pivotally secured at 43 an extension or tongue portion 44 of the ratio shifting arm or block 45. This block 45 is pivotally mounted between the side frame member 20 and the auxiliary frame arm 23 by the pivot bolt 46 which is pivotally aligned with the pivot bolt 35 for the first mentioned block 34, which it will be recalled is also pivotally mounted by the pivot bolt 46 on the opposite side of the arm 23. The block member 45 is provided with a bifurcated portion 47 between which is pivotally mounted the rod end bearing or terminal 48 of the control push-pull rod C3 at the pivotal connection C4.

The ratio changing mechanism 3 is accordingly comprised of: (1) the supporting frame assembly 20—21—22—23 which is pivotally mounted upon fixed aircraft structure by means of the pivot bolts 4 about the axis of which it is rockable as the mechanism is shifted from one ratio to another; (2) the lever assembly comprising the tube 24, the offset lugs 25, rockable about the pivots 26 and the lever arms 27, 28, and 29 pivotally connected to the upper terminal of the actuating link 18 and rockable about the aligned axis of the pivots 26; (3) the control stick link and bell-crank assembly 42 to 48, inclusive, which is also pivotally connected to the upper terminal of the actuating link 18 and to the free terminal of the lever assembly 24 to 29, inclusive; and (4) the control surface link and lever comprising the elements 30 to 37, inclusive, which is also pivotally connected to the upper terminal of the actuating link 18 and the free terminal of the lever assembly. It will be noted that both the control stick link and bell-crank assembly, as well as the surface link and lever assembly, each are actuated by the actuating link 18 on the same pivot axis 19—31—32—40 for rotation of the block elements 34 and 45 in opposite directions about the common pivot axis 35—46 at the top of the mechanism.

The intermediate pivots, however, for each of these assemblies, namely the pivots 33 and 43 are offset forward of and to the rear, respectively, of the vertical plane defined by the lines A—B in Fig. 4 which passes through the terminal pivots C4 and S4 as well as the fixed pivot 4 on the supporting frame and the rockable pivots 35—46 at the top of the supporting frame assembly. Accordingly, as the ratio shift mechanism is actuated, and the bell-crank 17 is rotated in the counter-clockwise direction from the two to one ratio position shown in Fig. 4, the axis of the pivot 17a is moved along the arcuate path defined by the line D as the link 18 is pushed upwardly and rearwardly such that it may be held in an intermediate position as shown in Fig. 5, or it may be moved further such that this pivot 17a coincides with the axis of the pivotal support 4 when the locking pin 13 becomes latched in the notch 12a, at the other extreme position, as shown in Figs. 1 and 2. The upward movement of the actuating link 18 imparts upward and spreading movements to the links 30 and 42 due to their offset pivots 33 and 43 with a toggle effect which rotates the block 34 in the clockwise direction about its pivot 35, and which simultaneously rotates the block 44 in the counter-clockwise direction about its pivot 46. As the rotation of the blocks 34 and 44 occurs in opposite directions about the common axis 35—46, and the pivotal connections C4 and S4 approach each other along the common arcuate path defined by the line F, the common pivot 35—46 is forced rearwardly to the right along the arcuate path defined by the line E such that in actuality with respect to fixed structure the pivots C4 and S4 move downwardly and upwardly, respectively, or together along the line A—B until they coincide at the point previously occupied by the common pivot axis 35—46.

In other words the arcuate path F represents the paths along which the pivots C4 and S4 would travel if the common pivot 35—46 were fixed, but inasmuch as the latter pivot is caused to move in the clockwise direction along the path E about the axis of 4 as the center, the arc F is in effect flattened out into the straight vertical line A—B and the pivots C4 and S4 move into the position previously occupied by the rocking pivot 35—46. Accordingly there is no appreciable change in the length of the control elements between the control stick C and the control surface S due to the change in the ratio of the device. The unit 3 in effect becomes a variable length lever rockable about its supporting pivot 4 upon which lever the pivotal connections of the control rod C4 and the surface rod S3 are shiftable to provide either a 1:1 ratio or a 2:1 ratio advantage or any intermediate ratio advantage. The disposition of the linkage is also such that once the unit 3 has been set for a predetermined ratio, the pilot or control forces transmitted through the system tend to compensate or balance each other within the shift mechanism 3 such that these forces are not transmitted to the locking mechanism and there is accordingly no possibility of the locking mechanism becoming unlatched due to these forces. In the 1:1 ratio arrangement shown in Figs. 1 and 2, it will be noted that the axes of the terminal fittings C4 and S4 coincide, with a concurrent longitudinal alignment of the push-pull rods C3 and S3 with the result that the ratio changing unit 3 becomes in effect a simple lever with its arm equivalent to the distance between the common pivot C4—S4 and the lever pivot at 4. In the 2:1 ratio disposition of the elements shown in Figs. 3 and 4, the mechanism 3 becomes in effect a lever having pivotal connections at the distances C4 and S4 from its pivot 4, and in the intermediate position of Fig. 5, the differences in the respective distances are not as pronounced.

Figures 6, 7, 8:
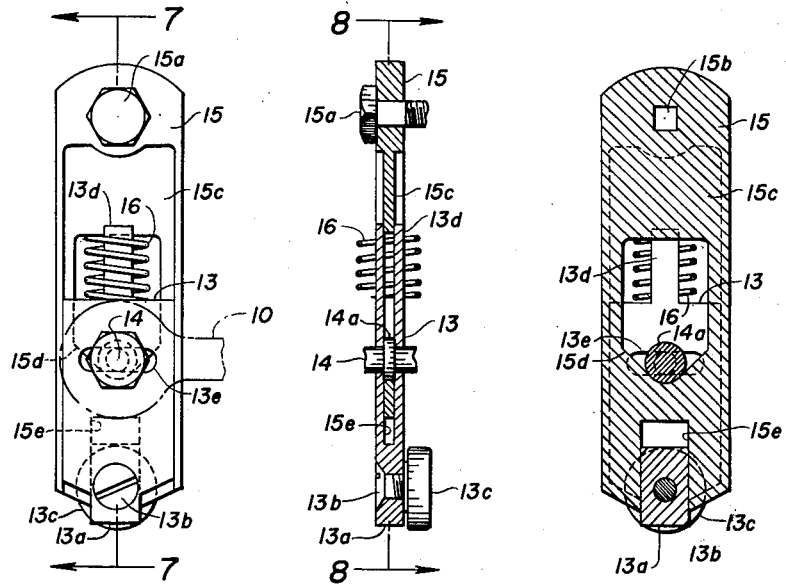
Fig. 6 is an enlarged view of the locking arm shown in Figs. 1 and 2.
Fig. 7 is a sectional view of the same taken at 7—7 of Fig. 6.
Fig. 8 is a further sectional view as taken at 8—8 of Fig. 7.

The locking arm 15 and its associated mechanism is shown in detail in Figs. 6, 7 and 8, in which it will be noted that the body or housing of the arm 15 is provided adjacent its upper terminal with a squared opening 15b to receive the squared shank portion of the pivot pin 15a which engages the lever 17 such that it forms a unitary bell-crank with the locking arm assembly 13—15. The housing 15 is formed with a guiding web portion 15c which is apertured to provide an upper double cam-faced opening 15d, and a lower open end guide slot 15e. The locking portion 13 is a complementarily shaped member formed such that it guidingly slides within the lock arm housing 15, being resiliently biased into its lower extended position by the intermediate compression spring 16. The locking member 13 is provided at its lower extremity with the extending tongue portion 13a engageable with the notches 12a and 12b of the arcuate guide 11, shown in Figs. 1 and 2, and has pivotally mounted thereon the roller 13c by means of the attachment screw 13b. The roller 13c is arranged to provide a camming relationship with the flattened surfaces 12c and 12d at the ends of the arcuate guide member 11, at either of which it permits the tongue 13a to be extended by engagement with the detents 12a and 12b, while serving to retract the tongue 13a intermediate these end positions. The upper portion of the locking member 13 is bifurcated or provided with a relatively deep transversely extending slot arranged for sliding engagement on each side of the central guide web 15c of the housing 15. This upper portion of the locking member 13 terminates in the bifurcated tongue portions 13d arranged to retain the compression spring 16 between the shouldered or main central portion of the locking member 13 and the opposed end of the upper opening in the web 15c. The members 13 and 15 are retained in their sliding telescopic relationship by the pivot bolt forming the terminal of the push-pull link 10, which pivot bolt passes through the transverse slots 13e in the front and rear portions of the member 13. The pivot bolt 14 has a roller element 14a mounted thereon which is retained between the front and rear portions of the member 13 and, upon push or pull forces exerted upon the rod 10, the roller 14a tends to ride up either of the cam faces 15d and to impart similar retracting movement to the locking tongue member 13.

This camming arrangement comprising the cam surfaces 15d and the slot 13e in cooperation with the pivot pin 14 and its roller 14a comprises a relatively important feature of the present invention, permitting locking the device in either of its extreme positions and readily unlocking it when so desired by the pilot. While the member 13 is normally pressed downwardly by the spring 16, it is movable upwardly by reason of the fact that a force exerted forwardly through the rod 10 causes the roller 14a on the pivot 14 to ride up the corresponding cam surface 15d to move the lower tongue portion 13a out of locking engagement with the notch 12a. Continued force on the rod 10 will swing the housing member 15 from 12a through any of the intermediate positions to the other extreme position 12b whereupon it will automatically be received in a locking relationship. Any further force on the rod 10 in the same direction tends only to hold the member 15 more firmly in the locked position due to the fact that the cam surface is now facing downwardly instead of upwardly. When it is desired to move the assembly in the opposite direction, a pull or tension on the rod 10 will cause the roller to ride up on the opposite cam surface 15d thereby again raising the element 13 by reason of the roller 14a on the pivot 14 being slidingly retained in the slot 13e in the element 13. This raises the element 13 out of engagement with the notch 12 to permit pivotal movement of the member 15 to a position where the tongue 13 can again engage the notch 12a. Continued rearward or tension force exerted on the rod 10 serves to more firmly hold the rod 10 in locked position by reason of the fact that the cam surface 15d in 15 has now changed direction and the roller 14a does not tend to ride up on this cam surface as a result of the tension force in the rod 10 when tongue 13a is received in 12a.

It will be understood that the control system shown in Fig. 1, has been outlined diagrammatically only, and in an actual installation it may be preferable to provide cables with cable sectors or sheaves, in order to compensate for the rocking of the mechanism 3 about its pivot 4 and to eliminate extensively long push-pull rods. Inasmuch as the pivots at either end of the link 18 become aligned with main pivot 4 in each of the two extreme positions of adjustment, the entire unit is free to pivot about the mounting points 4 on the plates 20 and 21 to thereby permit the mechanism to become repositioned without effecting any axial displacement of the control rods C3 and S3, and a relatively small and inconsequential displacement occurs when in the position of Fig. 5. The total movement of the several series or assemblies of links is appropriately limited by inter-engagement of the various shoulder portions carried by the blocks 34 and 44 which serve as limit stops and which coincide substantially with the terminal stops on the arcuate sector 11 of the locking assembly 15.

Other forms and modifications of the present invention, both with respect to its general arrangement and the details of its several parts, which may become obvious to those skilled in the art after reading the foregoing description, are intended to come within the scope and spirit of this invention, as more particularly set forth in the appended claims.

I claim:

1. In an aircraft control system having a control stick and a control surface, the improvement of variable ratio means pivotally mounted upon the aircraft, the said variable ratio means having a support frame and further comprising force transmitting means connecting said control stick with a first lever pivotally mounted upon said support frame, further force transmitting means connecting said control surface with a second lever pivotally mounted upon said support frame and ratio shift means including a toggle linkage operatively connected to said first and second levers for changing the moment arm relationship of each of said force transmitting means with respect to the pivotal mounting of said variable ratio means.

2. In an aircraft control system, a control stick, a control surface, a variable ratio mechanism pivotally mounted upon the aircraft, said variable ratio mechanism having side plate members, force transmitting means connecting said control stick with a first lever pivotally mounted upon said plate members, further force transmitting means connecting said control surface with a second lever pivotally mounted upon said side plate members, the axes of both lever pivotal mountings being axially aligned, and ratio control means operatively connected to said first and second levers adapted to vary the angular relationship of the said levers one to another for thereby changing the moment arm relationship of each said force transmitting means with respect to the pivotal mounting of said variable ratio mechanism.

3. In a control system, a control lever, a controlled member, a variable ratio mechanism pivotally mounted upon fixed structure, said variable ratio mechanism including plate-like body members, force transmitting means interconnecting said control lever with a second lever pivotally mounted upon said body members, further force transmitting means interconnecting said controlled member with a third lever pivotally mounted upon said body members, and control means operatively connected to said second and third levers adapted to rotate said second and third levers in opposite directions for changing the moment arm relationship of each said force transmitting means with respect to the pivotal mounting of said variable ratio mechanism to thereby change the ratio of movement of said controlled member with respect to said control lever.

4. In a control system, a control lever, a controlled member, a variable ratio mechanism pivotally mounted upon fixed structure, said variable ratio mechanism including a body frame, force transmitting means interconnecting said control lever with a second lever pivotally mounted upon said frame, further force transmitting means interconnecting said controlled member with a third lever pivotally mounted upon said frame, and shift control means including a toggle linkage pivotally and operatively connected to said second and third levers adapted to rotate said second and third levers in opposite directions for changing the moment arm relationship of each said force transmitting means with respect to the pivotal mounting of said variable ratio mechanism, to thereby change the ratio of movement of said controlled member with respect to said control lever.

5. In an aircraft, a control surface pivotally mounted upon the aircraft, a control stick movably mounted upon the aircraft, a support frame pivotally mounted upon the aircraft, a lever assembly pivotally mounted upon said support frame, a first lever pivotally mounted upon said support frame, means pivotally connecting said control stick with said first lever, a second lever pivotally mounted upon said support frame, means connecting said second lever with said control surface, and actuating means pivotally connecting said lever assembly with said first and second levers for changing the relationship of the pivotal connections from each of said levers to said force transmitting means with respect to each other and to the pivot axis of said support frame for varying the ratio of displacement of said control surface.

6. In an aircraft, a control surface pivotally mounted upon the aircraft, a control stick movably mounted upon the aircraft, a support frame assembly pivotally mounted upon the aircraft, a lever assembly pivotally mounted upon said support frame assembly, a first lever pivotally mounted upon said support frame assembly, means pivotally connecting said control stick with said first lever, a second lever pivotally mounted upon said support frame assembly, means connecting said second lever with said control surface, and actuating means pivotally connecting said lever assembly and said first and second levers for changing the relationship of the pivotal connections from said levers to said force transmitting means with respect to each other and with respect to the pivot axis of said support frame assembly for varying the extent of displacement of said control surface upon a given displacement of said control stick, said actuating means being adapted to simultaneously rotate said levers in opposite directions.

7. In an aircraft, a control surface pivotally mounted upon the aircraft, a control stick movably mounted upon the aircraft, a support frame assembly pivotally mounted upon the aircraft, a lever assembly pivotally mounted upon said support frame assembly, a first lever pivotally mounted upon said support frame assembly, means pivotally connecting said control stick with said first lever, a second lever pivotally mounted upon said support frame assembly, means connecting said second lever with said control surface, and actuating means pivotally interconnecting said lever assembly and said first and second levers for changing the relationship of the pivotal connections from said levers to said force transmitting means with respect to each other and with respect to the pivot axis of said support frame assembly for varying the degree of displacement of said control surface upon predetermined displacement of said control stick, said actuating means being adapted to rotate said levers in opposite directions.

8. In a variable ratio mechanism forming an intermediate link in a control system, a support frame pivotally mounted on fixed structure, a pair of connector links adjustably mounted on said frame, the said connector links being adapted to provide input and output pivotal connections from the frame to respective input and output portions of the control system, the said input and output connections being spaced from the axis of pivotal mounting of the support so that each input and output connection has an effective moment arm extending to said axis, and adjustment means operatively connected to the connector links adapted to vary the relationship of the said input and output connections with respect to the axis of pivotal mounting of the support frame whereby the effective moment arm of the input connection may be changed with respect to that of the output connection.

9. In a variable ratio mechanism adapted to form an intermediate link in a control system, a support frame pivotally mounted on fixed structure, a pair of levers pivotally mounted on said frame, the said levers each being adapted to provide connections spaced from the axis of pivotal mounting thereof for joinder to respective portions of the control system, links pivotally attached adjacent an otherwise free end of each lever, a third link pivotally attached at one end to the support frame and pivotally joined at its other end to the otherwise free ends of the lever attached links, and an adjustment means, the pivotally joined ends of said three links having a substantially common pivotal connection to the said adjustment means whereby upon operation of the adjustment means, the said levers will be rotated about the axes of their mounting pivots and by transmission of force through the said third link, the support frame will be rotated a corresponding amount about its support pivot.

10. In a force transmission system, a longitudinally extending input member; a longitudinally extending output member forming a substantially parallel laterally displaced longitudinal continuation of said input member; variable means adapted to pivotally connect the juxtaposed end portions of said members to supporting structure about a common axis thereby forming moment arms about the common axis; and means for shifting the pivotal end connections of said members away from and toward each other and away from and toward said common axis all in a plane normal to the longitudinal axes of said input and output members to vary the relative moment arms of the members about the common axis without relative longitudinal displacement of said members and without lengthening of said force transmission system.

11. In a force transmission system; a variable ratio mechanism having infinite variability between a first and second limiting position; an input member having a pivotal connection therein; an output member having a pivotal connection therein; said members having their longitudinal axes in a common plane with their pivotal connections being in axial alignment with each other in said first limiting position, said variable ratio mechanism including a first lever means connected at one end to the pivotal connection of said input member and pivotally mounted at its other end on said mechanism to rock about a second axis, said variable ratio mechanism also including a second lever means connected at one end to the pivotal connection of said output member and pivotally mounted at its other end on said mechanism in alignment with said second axis to rock about said second axis, said variable ratio mechanism being pivotally mounted about a third axis on fixed supporting structure thereby forming moment arms from said output and input pivotal connections about said third axis; and means for effecting lateral displacement of said members from the common plane of said first limiting position to a second position while maintaining the pivotal ends of the input and output members in a plane normal to the longitudinal axes of said members whereby the relative moment arms of the members about the third axis can be varied without causing a longitudinal displacement of the members.

References Cited in the file of this patent

UNITED STATES PATENTS

| | | |
|---|---|---|
| 304,673 | Skinner | Sept. 2, 1884 |
| 503,385 | Pflegher | Aug. 15, 1893 |
| 737,541 | Williams | Aug. 25, 1903 |
| 1,020,261 | Campbell | Mar. 12, 1912 |
| 2,205,610 | Van Nes | June 25, 1940 |
| 2,276,702 | Riparbelli et al. | Mar. 17, 1942 |
| 2,338,379 | Henke | Jan. 4, 1944 |
| 2,373,739 | Batterson | Apr. 17, 1945 |
| 2,478,033 | Weick | Aug. 2, 1949 |
| 2,510,122 | Lomholt | June 6, 1950 |
| 2,511,446 | Scheer | June 15, 1950 |
| 2,601,458 | Robert | June 24, 1952 |
| 2,685,422 | Hammond et al. | Aug. 3, 1954 |

FOREIGN PATENTS

| | | |
|---|---|---|
| 605,286 | Great Britain | July 20, 1948 |